US005493279A

United States Patent [19]

Dawson et al.

[11] Patent Number: 5,493,279

[45] Date of Patent: Feb. 20, 1996

[54] ELECTRONIC COMBINATION LOCK WITH COVERT ENTRY DETECTION FEATURE AND METHOD OF COVERT ENTRY DETECTION

[75] Inventors: Gerald L. Dawson; Thomas E. Cassada, both of Lexington; Michael J. Kelly, Harrodsburg; Craig B. Williams, Lexington, all of Ky.

[73] Assignee: Mas-Hamilton Group, Lexington, Ky.

[21] Appl. No.: 36,426

[22] Filed: Mar. 24, 1993

[51] Int. Cl.$^6$ .......... G06F 7/04

[52] U.S. Cl. .......... 340/825.32; 340/542; 340/825.34; 70/280

[58] Field of Search .......... 340/825.31, 825.32, 340/825.5, 542, 543, 506, 524, 525, 570, 691, 825.34; 361/171, 172; 70/277, 278, 280

[56] References Cited

U.S. PATENT DOCUMENTS

| | | | |
|---|---|---|---|
| 4,370,644 | 1/1983 | Droz | 340/542 |
| 4,684,945 | 8/1987 | Sanderford, Jr. | 70/278 |
| 5,061,923 | 11/1991 | Miller et al. | 340/825.31 |
| 5,083,122 | 1/1992 | Clark | 340/825.31 |

*Primary Examiner*—Donald J. Yusko
*Assistant Examiner*—Gregg V. Miller
*Attorney, Agent, or Firm*—Laurence R. Letson

[57] ABSTRACT

An electronic combination lock is provided with and incorporates the enhanced feature of covert entry detection and notification. Whenever the bolt of an electronic lock provided with this enhancement is retracted to its withdrawn or unlocked position and whenever the lock has not received an authorized combination enabling the movement of the bolt, movement of the bolt is detected and the electronics of the lock is powered for a time sufficient to record an indication of the covert entry in its non-volatile memory. Upon normal operation at a subsequent time, the indication of covert entry is read from the non-volatile memory and a visual indication is displayed to the operator to inform the operator that covert entry has occurred. The lock may be configured either to permit the lock to open with an authorized combination after display of the covert entry indication to the operator; or alternatively, the lock may be configured to be disabled as a result of the detection of a covert entry such that the lock will refuse to accept all authorized combinations until such time as the lock has been reset or reconditioned to remove the covert entry indications stored in the memory.

28 Claims, 10 Drawing Sheets

| FIG. 4A | FIG. 4B |
|---|---|

ELECTRONIC COMBINATION LOCK WITH COVERT ENTRY DETECTION FEATURE AND METHOD OF COVERT ENTRY DETECTION

FIELD OF THE INVENTION

This invention relates to devices for indicating covert entry into secure containers and, more specifically, relates to the controls that will indicate to the operator of a high security combination lock on a secure container that the lock has been covertly entered or operated.

BACKGROUND OF THE INVENTION

Many safes and security containers have high security combination locks installed thereon. The locks on the cabinet or container are subject to many types of attack in an effort to open the lock. Attacks may range from destruction of the lock itself, an attack such that the operator cannot detect that the lock has been attacked, violated or compromised, and further to an attack such that an expert cannot detect that the lock has been violated or compromised.

For a high security lock to be used for the highest level of protection such as that used for the most sensitive documents, United States government standards require that a lock be approved under Federal Specification FF-L-2740. The lock must be able to withstand attack for a period of thirty minutes; additionally, any access through such a lock must not be detectable by the operator. The type of attack and entry which is undetectable to the operator is known as a covert entry. Covert entry and covert attack are particularly pernicious since the authorized operator does not know that the contents of the safe or security container have been compromised. By virtue of the fact that the lock appears to have not been violated or tampered with but which in fact have been compromised, National security secrets which are believed to be secure thereafter may be relied upon in the normal course of governmental business; the results of such reliance on secrets which have been compromised without the knowledge of the custodian of those secrets can be particularly ruinous.

A great deal of effort has gone into the design of locks, containers and other devices which will resist covert attack and covert entry. The most efficient way to reset covert attack or entry is to design the lock so that the operator must be able to observe and recognize signs which indicate any type of attack. The obvious observable signs of a physical attack include disruptions in the surface of the security container, mars, scratches or other abuse indicators on the lock dial or lock housing.

A lock also should reveal its compromised status if a covert entry should occur. With the revelation that covert entry has occurred with respect to a lock and this covert entry having been recognized by the operator, the operator then is aware that the contents of the security container may have been compromised and thus take steps to insure that the damage occasioned by such compromise either is eliminated or minimized.

Since the covert entry standard for locks requires that to be a covert entry the entry be undetectable by the operator, no external markings, mars or other signs of attack can remain for observation; additionally, the lock must properly function after the attack or the operator then would be aware that the lock may have been compromised. A solution to the covert entry standard is to render the lock to a condition that the operator must observe and that will clearly indicate to the operator that a covert attack had occurred or that covert entry had been accomplished. This operator indication preferably must be shown in such a way that the entry will be unavoidably indicated. For example, after the covert entry the lock could be rendered inoperable until the lock is reconditioned for proper operation.

Although destruction or damage to the container renders the attack and entry readily observable, any person attempting a covert entry would avoid leaving such obvious indications. Therefore, with the lock remaining in undamaged, or unmarked condition, the detection of covert entry and the actions based thereon must detect any movement of the bolt to permit entry to the container or other attack which would not be otherwise observable. If the lock cannot be affected in a way that it is observable or detectable by the operator and the container must maintain the same structural integrity and appearance after the covert entry attack, the only ways for the covert entry to occur are to move the bolt from the locked or extended position to the unlocked or retracted position or to completely remove the bolt, thereby allowing the door of the container to be moved to permit access. Thereafter, the door or cover must be repositioned in the normal closed position and the fact that the door has been moved must not be observable or detected by the operator.

If the back cover is removed to tamper with the internal works of the lock, then the operator may not be able to observe any evidence that the back cover has been removed. The back cover removal may be considered a covert entry or covert attack.

With electronic high security locks there are opportunities to inform the operator that covert entry has occurred. Covert entry is considered any withdrawal of the bolt from its extended or locked position without the entry into the lock of an authorized combination, or the removal of the lock back plate thereby granting access to the electronics of the lock. Other forms of attack which may be considered covert attacks are lock housing cover removal or magnetic attack.

OBJECTS OF THE INVENTION

It is an object of the invention to detect covert entry or covert attack on the lock.

It is another object of this invention to inform the operator of the fact that a covert entry has occurred.

It is a further object of the invention to display to the operator an indication of the covert entry that has occurred.

It is still another object of the invention to store electronic indications of covert entry and to retain the stored indications to use to control the display of an operator notification.

It is a still further object of the invention to display the indication of covert entry to the operator but continue to allow the authorized combination to be used to open the lock.

It is still another object of the invention to display the indicator that the covert entry has occurred and at the same time to disable the combination lock such that the authorized combination will not operate and unlock the lock.

The need for covert entry detection and notification is satisfied and the objects of the invention are accomplished by the invention described herein. A summary understanding of the invention may be had from the Summary of the Invention below.

SUMMARY OF THE INVENTION

An electronic combination lock of the type manufactured and sold by Mas-Hamilton Group of Lexington, Kentucky, 40511 under the designation Mas-Hamilton Group X-07, hereinafter referred to as X-07, provides an excellent basis for the incorporation of this invention, this invention is not limited in its utility to any single lock or lock type. It should be understood that with provision of a suitable power source, this feature could be implemented on a purely mechanical lock.

The X-07 lock has a bolt which must be withdrawn to an unlocked or withdrawn position in order to permit the opening of any container on which the lock is installed.

The withdrawal of the bolt is controlled by a microprocessor or other logic control device such as an ASIC, within the lock assembly which compares combinations which are entered into the lock and combinations which are stored in the lock as authorized combinations.

The discussion of the Mas-Hamilton Group X-07 lock operation and structure may be found in U.S. Pat. No. 5,061,923, issued Oct. 29, 1991 to James C. Miller, et al.

The Mas-Hamilton Group X-07 lock provides excellent security and meets the requirements of Federal Specification FF-L-2740. To render the Mas-Hamilton Group X-07 lock even more secure and to further improve its performance and resistance to covert entry, the X-07 lock may be provided with a sensing device to detect the withdrawal of the bolt to a retracted (open) position. One example of such a bolt movement sensing device is described in patent application Ser. No. 07/981,052, filed Nov. 24, 1992, entitled "Status Monitoring System for an Electronic Lock", by Gerald L. Dawson, et al. The detection device may incorporate a magnet and reed switch wherein the magnet is mounted on or in the bolt, and the magnet moved with the bolt so that it is positioned adjacent the reed switch when the bolt is moved. When the bolt is moved in any manner, the movement of the bolt shifts the position of the magnet and affects the reed switch causing the reed switch to transfer, thereby creating a signal in the form of a rise in voltage, which may be recognized by and utilized by the electronic circuitry contained within the lock to activate the covert entry detection and recording system.

Alternate embodiments may utilize lever actuated mechanical switches, photo diodes, photo transistors and external or internal light sources and light detectors as well as Hall Effect solid state electronic devices. The above devices may be substituted for the magnet and reed switch arrangement if desired, with only nominal modifications to the electronic circuitry.

Since the Mas-Hamilton Group X-07 lock is a self-contained, self-powered lock utilizing a manually operated generator, the power for the covert entry detection system is readily available. A long storage life, low leakage capacitor, commonly referred to as a Super Cap, may provide the alternate power necessary to cause the lock to respond to a bolt movement detection. Alternate power sources which may be used in lieu of the Super Cap could include batteries, an external power source, or photocells, if adequate light is available, which charge either a capacitor or a rechargeable battery. The charged Super Cap may also be utilized with step-up/down converters or step-up converters which will provide an enhanced voltage level even after the voltage on the Super Cap has dissipated to a level which may be insufficient to power the necessary electronics in the lock.

The lock is provided with a detection circuit which provides an electrical output generated when the bolt is moved to an open position. This circuit incorporates the detection device such as the magnet and reed switch referred to above. The circuit responds to a switch closure (change of state) in the detection device and provides a signal to the microprocessor in the form of an alternate operating voltage sufficient to cause the microprocessor to power-up and run an initialization routine contained within the ROM (Read Only Memory) memory of the microprocessor. The initialization routine further may be supplemented with a program control routine which causes the writing of an indicator in a separate or integral non-volatile memory indicating that the bolt has been moved from a locked to an unlocked position under conditions that would indicate that the lock has not been operated by an authorized combination entered into the lock.

Many locks may be dialed with an authorized combination, conditioning the lock to open but then left unoperated with regard to the final step of bolt withdrawal. When this occurs, the operator may return later and merely withdraw the bolt. The only difference between this procedure and a valid opening would be the time delay between the entry of the combination and the bolt withdrawal operation. This invention correlates the combination entry with the bolt withdrawal; and if the lock has lost its main electrical power after the combination has been entered but before the bolt is withdrawn or a predetermined time period elapsed before bolt withdrawal, the bolt withdrawal will be considered an invalid entry. If, on the other hand, the bolt is withdrawn and a valid combination has not been entered prior to bolt withdrawal, the entry is a covert entry.

The non-volatile memory, which may take the form of electronically erasable, programmable read-only memory (EEPROM), non-volatile random access memory (NVRAM), a ferromagnetic RAM, core memory, latched or reed relays, or electrical charges stored in capacitors, may be separate from the microprocessor or integral to the microprocessor.

The flag or stored code indicating a covert entry is tested by the microprocessor whenever the microprocessor is powered-up and the microprocessor initialization routine run. If the flag indicating a covert entry is set, the condition will cause the lock to display a visual indicator of the covert entry to the operator so that the operator is informed that a covert entry into the security container has occurred. Since the lock uses a display for operation and number display, the operator cannot avoid seeing the covert entry indicator. Displaying this visual indicator to the operator allows the operator to be informed that a covert entry has occurred previous to the current opening attempt.

The operator notification that the lock has been covertly entered may be accomplished for any covert entry which occurred during a time period when the alternate Super Cap carried sufficient power to operate the microprocessor for a period of about 50 milliseconds. Super Caps, long storage life, low internal leakage capacitors with sufficiently low discharge losses to maintain the necessary charge for an extended period of time, are available on the market. An example of such a Super Cap is a Carborundum type LC, 0.1 Farad capacitor part number LC055104A, available from the Carborundum Company of Niagara Falls, New York 14302.

Further, another alternate embodiment may cause the lock to be disabled and not to accept any valid, authorized combinations to open the lock until such time as the lock is reset. Disablement of the lock to prevent its opening in spite of legitimate authorized combinations and tight control of any resetting procedure or resetting codes will force management and supervisors to be informed of the covert entry. The operator of the lock must secure some assistance from a supervisor or manager in order to reset the lock and/or gain access to the container. This insures that the supervisory personnel are aware that a covert entry has occurred with respect to that container and does not permit the operator to hide or secrete occurrence of a covert entry.

The security enhancement provided by the covert entry detection capability can exist for periods of only a few days to several months. The most critical security facilities need covert entry detection enhancement for varying periods from a few days to a few weeks. This relative short period of time is satisfactory because each time the lock is dialed to open the lock, the manually operated generator of the lock will recharge the capacitors of the electronics that act as power sources and then thereby restart the period of effective protection. Further, in a highly secure area, when each lock is checked by a guard or watchman, the dial is turned to insure that the lock is secure. The turning of the dial will partially recharge the Super Cap, extending the period of enhanced security.

While periods of effective detection of several months are desirable, most safes and security containers are routinely opened every few business days and, in many cases, several times each day. Accordingly, the life of the powering charge on the alternate Super Cap may be for only a few days and still provide very substantial benefits in terms of enhanced security.

A more detailed and complete understanding of the invention may be obtained from the attached drawings and the detailed description of the invention to follow.

DRAWINGS

DETAILED DESCRIPTION OF THE PREFERRED EMBODIMENT OF THE BEST MODE CONTEMPLATED BY THE INVENTORS FOR CARRYING OUT THE INVENTION

Figure 1:
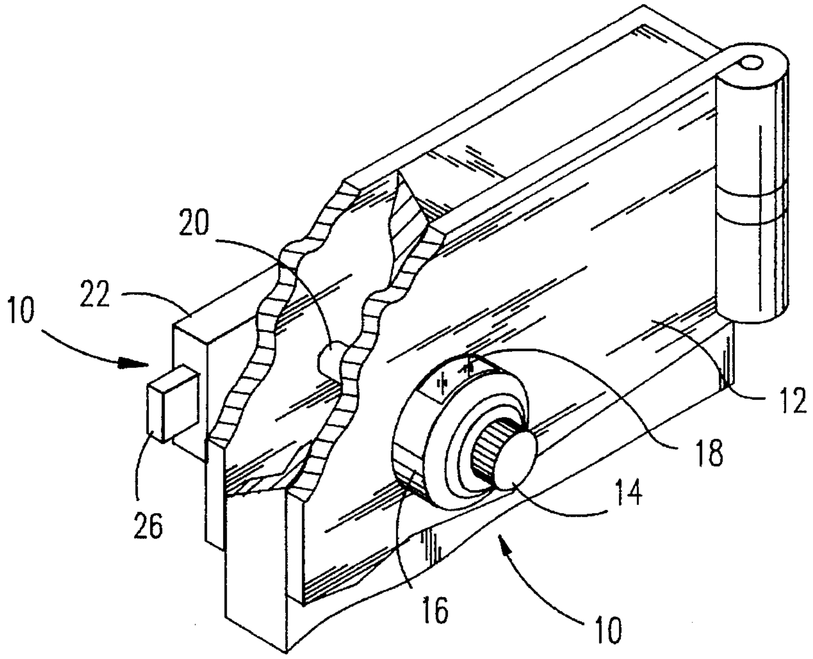
FIG. 1 illustrates an electronic combination lock installed on a door of a security container.

Referring to FIG. 1, an electronic lock of the type utilized in this invention is indicated as a lock 10, mounted on safe or vault door 12. Lock 10 comprises a knob 14 for dialing combinations into the lock 10, a dial housing 16 and a liquid crystal display 18. Shaft 20 extends from knob 14 to the lock mechanism housing 22. Extending from the lock mechanism housing 22 is a bolt 26 which must be withdrawn to allow door 12 to swing open and permit access to a secure area.

Figure 2:
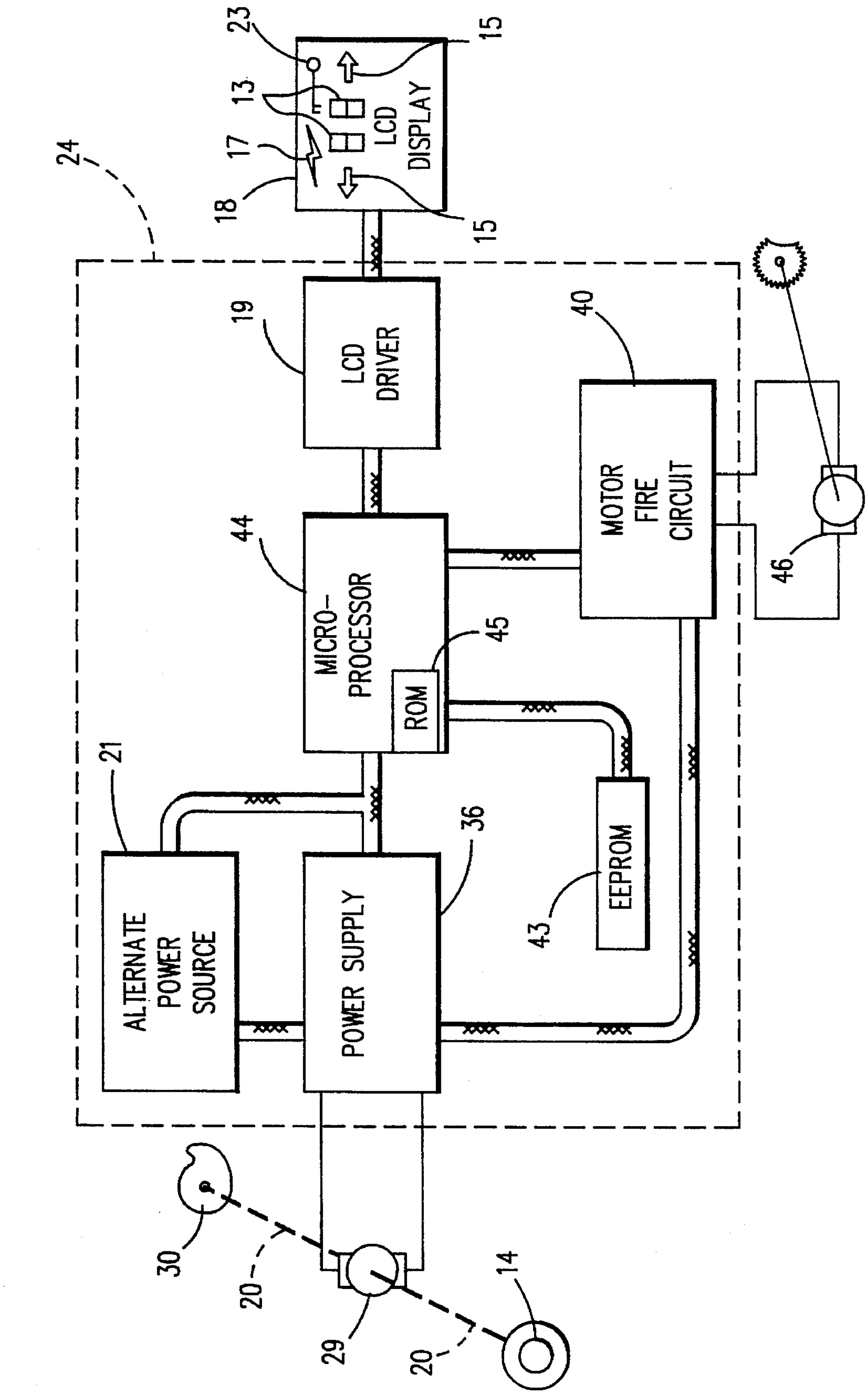
FIG. 2 illustrates in schematic form the electronic controls of the lock of FIG. 1.

Referring now to FIG. 2, the dial 14 is connected to the generator 29 and to the retractor drive cam 30. The generator 29 may be a stepper motor driven as a generator. As the generator 29 is driven by the dial 14 and shaft 20, a series of electrical pulses are generated and fed to the power supply 36 for rectification and shaping. The shaping of the pulses is accomplished by circuitry that is conventional and forms no part of this invention. The electrical pulses are then fed to the microprocessor 44. The pulses are out of phase so they may be used to determine the direction of the rotation of the dial 14.

The power supply 36 also charges an internal capacitor, discussed later and designated C100, with electricity generated by the generator 29. The voltage, Vcap of the capacitor C100, is then supplied to the microprocessor 44. The microprocessor 44 is powered for a limited time after dialing ceases with the charge stored in capacitor C100, Vcap within the power control 36. Powered time of the microprocessor 44 is dependent upon the capacitance of the capacitor C100 and the current drain of the microprocessor 44 and display 18 and liquid crystal display driver 19. The size of the capacitor C100 is selected in coordination with the power requirements of the remainder of the system to provide power to the system for approximately 90 seconds after the dial 14 and the alternator 29 have ceased to generate electricity. This 90 second period provides adequate time to open the lock 10 or to pause in the entry of the combination without losing the previously entered elements of the combination. On the other hand, the time period is long enough to provide a significant delay in the reset of the lock electronics 24 after the lock 10 has become unopenable due to any of several conditions having occurred.

Microprocessor 44 provides outputs to a display 18 through LCD driver 19. The display 18 is capable of displaying alphanumeric symbols 13 of at least two digits and arrows 15 pointing in opposite directions. Symbols such as a lightning bolt 17 for an error symbol or a key symbol 23 are used to indicate selection of the combination change mode, while alphabetic characters may be used to denote functions or status.

The preferred display 18 is a Liquid Crystal Display or LCD device which has the advantage of being a relatively low consumer of electrical power. Low power consumption is a significant consideration since power generated by the rotation of the lock dial 14 is relatively small and must be stored within the components of the power supply 36.

Figure 3:
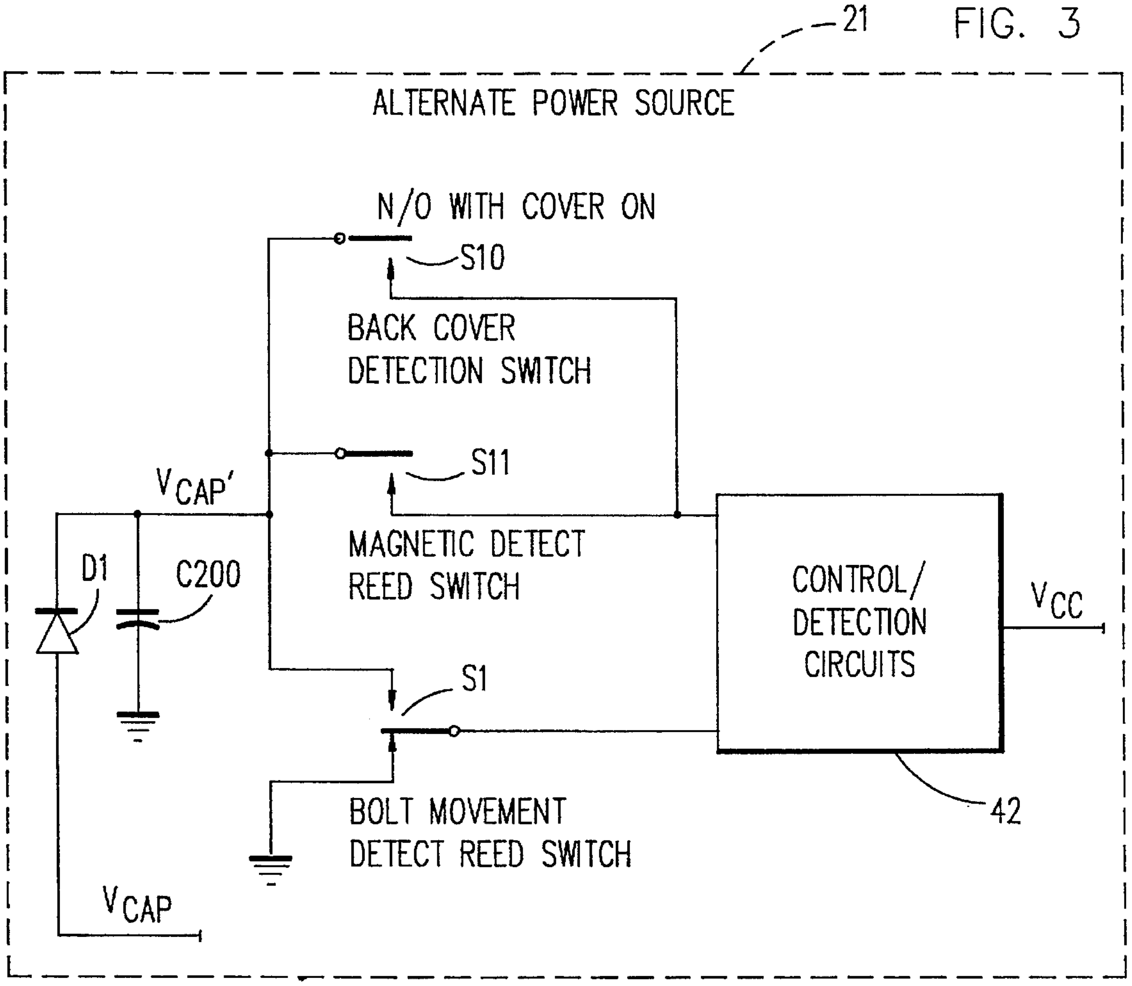
FIG. 3 illustrates the alternate power source shown in block diagram form in FIG. 2.

Referring to FIG. 3, the alternate power source 21 of FIG. 2 is amplified. Alternate power source 21 is connected between power supply 36 and microprocessor 44 and provides electrical power to microprocessor 44 when the power supply 36 does not have sufficient stored electrical energy to operate the microprocessor 44 and when enabled by the movement of bolt 26.

Switch S1 is transferred by the movement of the bolt 26 and will provide voltage Vcap' from C200 to the control detection circuit 40.

Switch S10, shown as 242 in FIGS. 10A–10D, is preferably a reed switch held open by a magnetic flux field. When the magnet 241 controlling S10 is moved, the switch closes signaling a covert entry to lock 10, when the back plate 23 is removed. Switch S10 may be a mechanical switch held open by the force of the cover being present and closed by cover removal.

Figures 4, 4A:
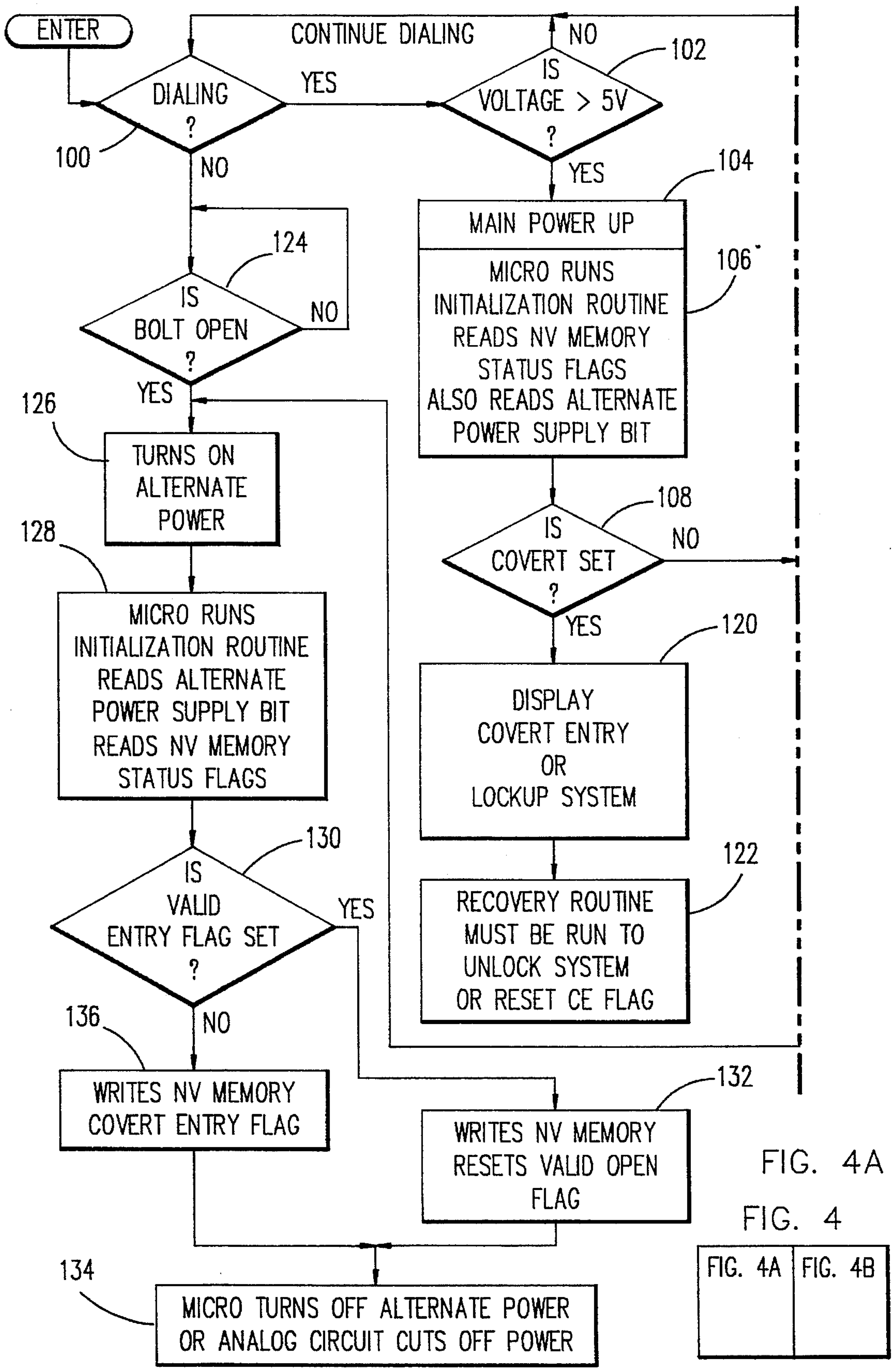
FIG. 4 illustrates the relationship of FIG. 4A to FIG. 4B.
FIGS. 4A and 4B are portions of a flow diagram representing the logic for operating the lock of FIG. 1 without the inhibition of an alternate power source.
Figure 4B:
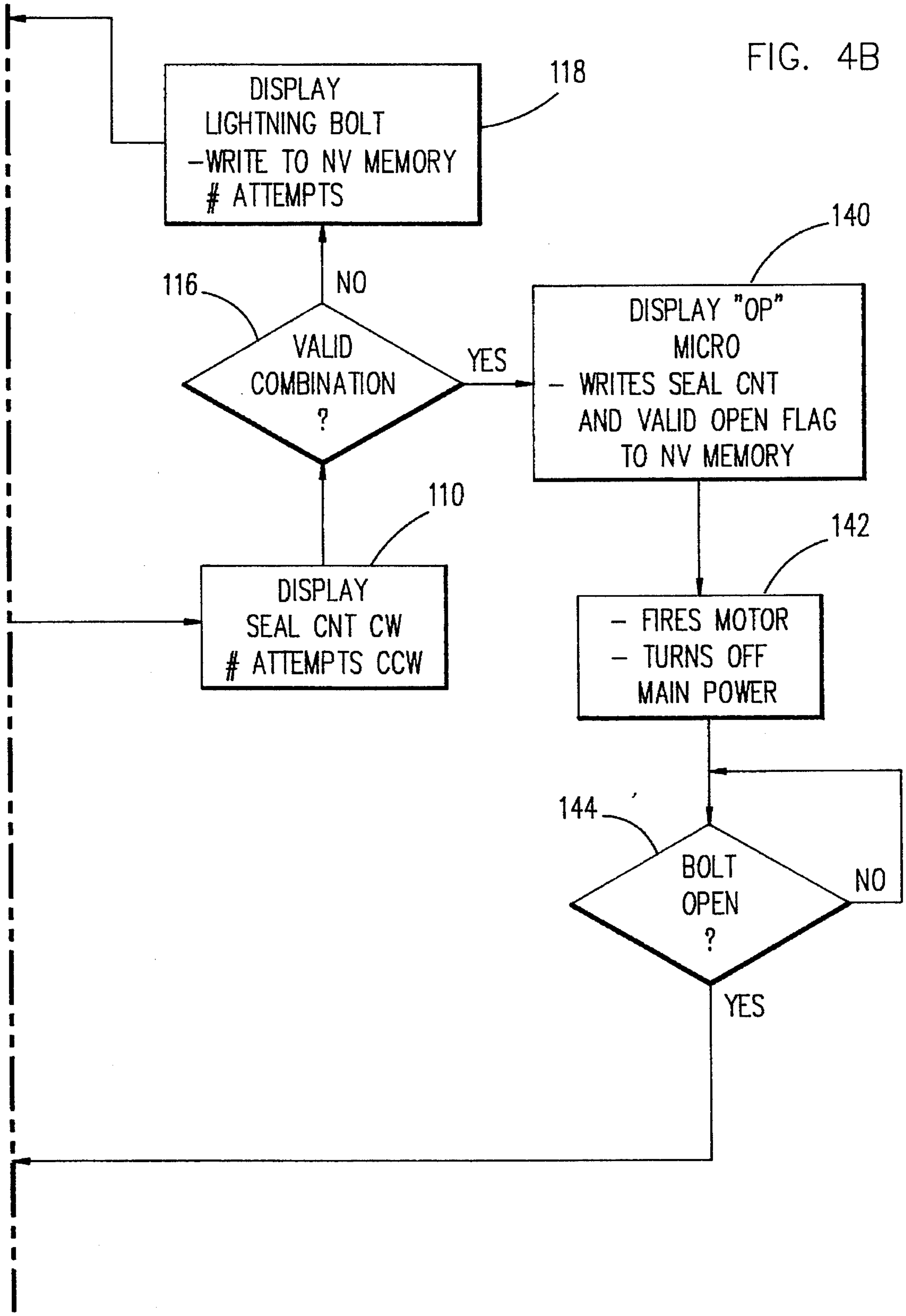
Figure 6:
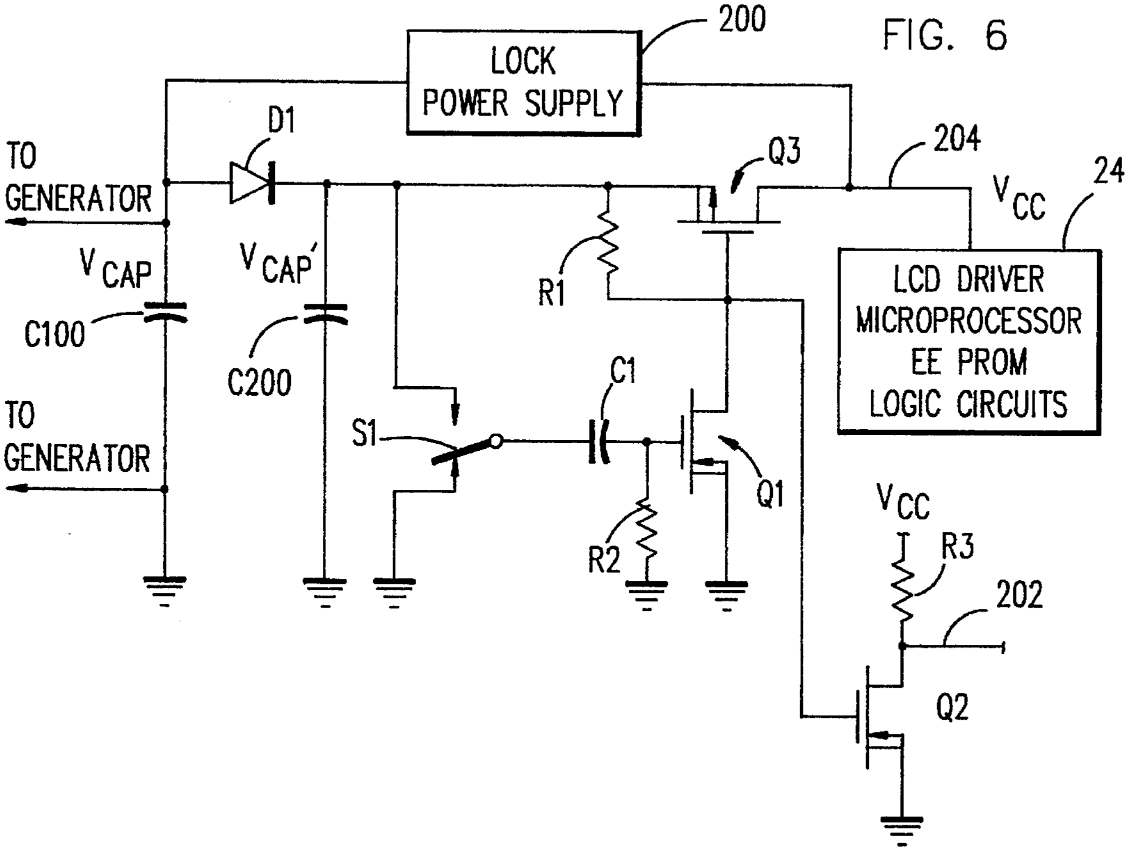
FIG. 6 illustrates a circuit for detecting movement of the lock bolt.

Referring now to FIG. 4, the functions and operations involved in operating the lock 10 and particularly in operating the covert detection feature are illustrated. At block 100 entry is accomplished by determining if dialing of dial 14 shown in FIGS. 1 and 2 is occurring. If dialing is occurring, the affirmative path is followed to operation 102 where the charge on the primary power source, capacitor C100 in FIG. 6 is tested for a threshold voltage of 5 volts. This operation is accomplished by a voltage detection circuit within the power supply 36 supporting the microprocessor 44 schematically indicated in FIG. 2. The voltage across capacitor C100 will rise as the dialing continues and, accordingly, the threshold detection logic will not function to permit any electronic function until such time as the voltage reaches the 5 volt threshold necessary for microprocessor 44 operation. Until such time, continued dialing is required as indicated by the negative path out of block 102. As dialing continues and the voltage supplied from capacitor C100 ultimately exceeds 5 volts, then the voltage detection circuit will detect the minimum 5 volt threshold and then will permit power to be applied to the microprocessor 44. The application of power to the microprocessor 44 is represented by the affirmative path from decision block 102 routing to operation 104. In operation 104, main power-up of the microprocessor 44 is accomplished. Thereafter flow is to operation 106 where the microprocessor 44 is turned on by the powering of the microprocessor 44; upon power-up, microprocessor 44 runs the initialization routine of the lock 10. The initialization routine is defined by the microprocessor manufacturer and includes the reading of the non-volatile memory 43 for stored status flags. The status flags stored in the non-volatile memory 43 may represent both an alternate power supply bit and the Covert Entry flag, as well as other information. After the reading of the Covert Entry flag memory location, the contents of that memory location are tested in operation 108 to determine whether the Covert Entry flag is set. If the Covert Entry flag is not set, then the indication is that no covert entry has been accomplished and the negative path from operation 108 is followed to operation 110. At operation 110 the seal count is displayed when the dial 14 is turned clockwise. Also at operation 110 the number of attempts count is displayed when the dial 14 is turned counterclockwise. The seal count is an internal audit count maintained in the non-volatile memory 43; the seal count is incremented each time to indicate the total number of times the lock 10 has been correctly opened. The number of attempts count indicates the number of erroneous entries of a combination or failed attempts to operate the lock 10 since the last time the lock 10 was properly and successfully opened.

Following operation 110, the lock 10 receives each turn of dial 14 and interprets that as the entry of a combination number. In operation 116, the combination entered is compared with the authorized combination stored in the lock 10 non-volatile memory 43 to determine whether a valid combination has been entered into the lock 10. In the event that the combination entered is determined to be invalid, then the error signal in the form of a lightning bolt is displayed at operation 118. The display of the lightning bolt occurs on display 18 as illustrated in FIGS. 1 and 2. The number of attempts count likewise is incremented and then written to the non-volatile memory 43 in operation 118. Following the completion of operation 118, the flow returns to block 100.

Referring again to operation 108, in the event that the Covert Entry flag has been set, operation 108 will determine that fact, and the flow then will progress by the affirmative branch to operation 120 where the Covert Entry indication is displayed on display 18. The Covert Entry indication will be the first symbol displayed in the opening sequence and will remain displayed for several complete turns of the dial 14.

The preferred method of implementation of operation 120 allows the lock 10 to be opened each time a valid combination is entered. The Covert Entry indication will be displayed on the LCD 18 each time the lock 10 is dialed for several 360° turns of the dial 14 prior to allowing the combination to be dialed. This will sufficiently alert the operator to the fact that a covert entry has occurred and will continue to indicate covert entry at the beginning of all dialing sequences until a recovery routine is run that resets the display routine and Covert Entry flag. The recovery routine may be implemented by using a special select mode number and sequence of numbers to be entered to reset the display indication and covert entry flag in the non-volatile memory 43 by the microprocessor 44.

An alternative method to perform operation 120 would be to lock up or disable the lock 10 by conditioning microprocessor 44 to prevent any further access to the container through lock 10. Disabling the lock 10 could cause the microprocessor 44 to refuse to accept any valid combination for the purposes of opening the lock 10. This action then prevents access to the contents of the security container using an authorized combination until such time as an appropriate reset routine can be entered into the lock 10.

The recovery or reset routine for the lock 10 must be entered into the lock 10 in order to reset its condition and permit the lock 10 to be unlocked by a dial 14 entered combination. The entry of the reset routine or recovery routine likewise will reset the Covert Entry flag. This recovery or reset operation is represented by operation 122. Upon the completion of operation 122, the lock 10 then is reconditioned for acceptance of a valid combination and so will open upon the entry of such a valid combination.

Referring now to operation 100, if dialing is not occurring, then the bolt 26 will be constantly monitored by the covert entry detection circuit (to be described later) and to determine whether the bolt 26 has been moved and the negative path is followed to operation 124. This continual monitoring is represented by operation 124. So long as the bolt 26 has not moved, the monitoring will continue and is represented by the negative path from operation 124 and the continuous looping through the logic of operation 124.

Should bolt 26 be in its open (withdrawn) position, the detection of that fact is accomplished by the detection switch S1 of FIGS. 6, 8 and 9, to be described later. The detection of the bolt 26 in its open position results in the alternate power supply voltage Vcap' being turned on in operation 126. The activated alternate power source is the alternate Super Cap C200 which is maintained in a charged condition for extended periods of time. Turning on the voltage Vcap' from the alternate power source C200 will provide electrical energy to the microprocessor 44 as represented by operation 126. Upon the receipt of Vcap', microprocessor 44 will run its initialization routine as in operation 104, with the only difference being the source of the power. The initialization routine will read the alternate power bit and also will read the non-volatile memory 43 status flags, which include Covert Entry flag and a valid open flag.

From the retrieval of the status flags in operation 128, the flow is to operation 130 where the Valid Entry flag data is tested to see if the Valid Entry flag is set. If the Valid Entry flag is set the logic branches through the affirmative path to operation 132 where the non-volatile memory 43 is written to reset a Valid Entry flag; then the flow is directed to operation 134 where the microprocessor 44 turns off the alternate power source (Super Cap C200) or the analog alternate power control will cut off the power from the Super Cap C200. This alternate power cutoff maintains the maximum possible charge on the capacitor C200.

Should the Valid Entry flag not be set as determined in operation 130, then the flow is to operation 136 where the non-volatile memory 43 is written to indicate that a covert entry has occurred. Following the writing of the Covert Entry flag into the non-volatile memory 43 by the microprocessor 44, operation 134 occurs as previously described.

Refer once again to operation 116. In the event that the combination entered through dial 14 is a valid combination, then the flow is directed through the affirmative path to operation 140 where the display will show the symbols "OP" to indicate that the lock is ready to open. Microprocessor 44 then will increment the seal count and write the new seal count to non-volatile memory 43 as well as set the valid open flag.

Following operation 140 the flow is to operation 142 where the motor 46 of FIG. 2 will be energized or fired by motor fire circuit 40 to permit the mechanical elements of the lock 10, gear 48, cam 30 and other mechanical elements not shown, to function and withdraw the bolt 26 from its extended, locked position to its retracted, unlocked position. The precise nature of the other mechanical elements need not be explained here since they do not form a part of this invention.

Following operation 140, operation 142 will turn off the main power supply to conserve the remaining stored charge in capacitor C100 to be shown and discussed later.

Upon the completion of operation 142, the logic flow is directed to operation 144 where the position of the bolt 26 is monitored. So long as the bolt 26 has not been moved, the monitoring of the bolt 26 position will continue; and additionally, upon an affirmative determination that the bolt 26 has been moved, the flow will follow the affirmative path and enter operation 126. The purpose of monitoring the bolt 26 to determine whether the bolt 26 has been moved is to insure that the movement of the bolt 26 from its extended to its withdrawn position after the termination of the opening sequence and shut down of the microprocessor 44 serves to turn on capacitor C200 and to determine whether the bolt 26 opening is a result of a valid combination entry. If a valid combination has been entered, then operations 126, 128, 130 and 132 will insure that the opening of the bolt 26 does not result in a Covert Entry indication upon the next bolt retraction. However, in the event that the bolt 26 is moved and the Valid Open flag has not been set as a result of a timely entry of an authorized combination, operation 130 will divert the flow through operation 136 where the Covert Entry flag will be written into the non-volatile memory 43 insuring that upon any subsequent opening, the Covert Entry indication is displayed to the operator.

Figure 5:
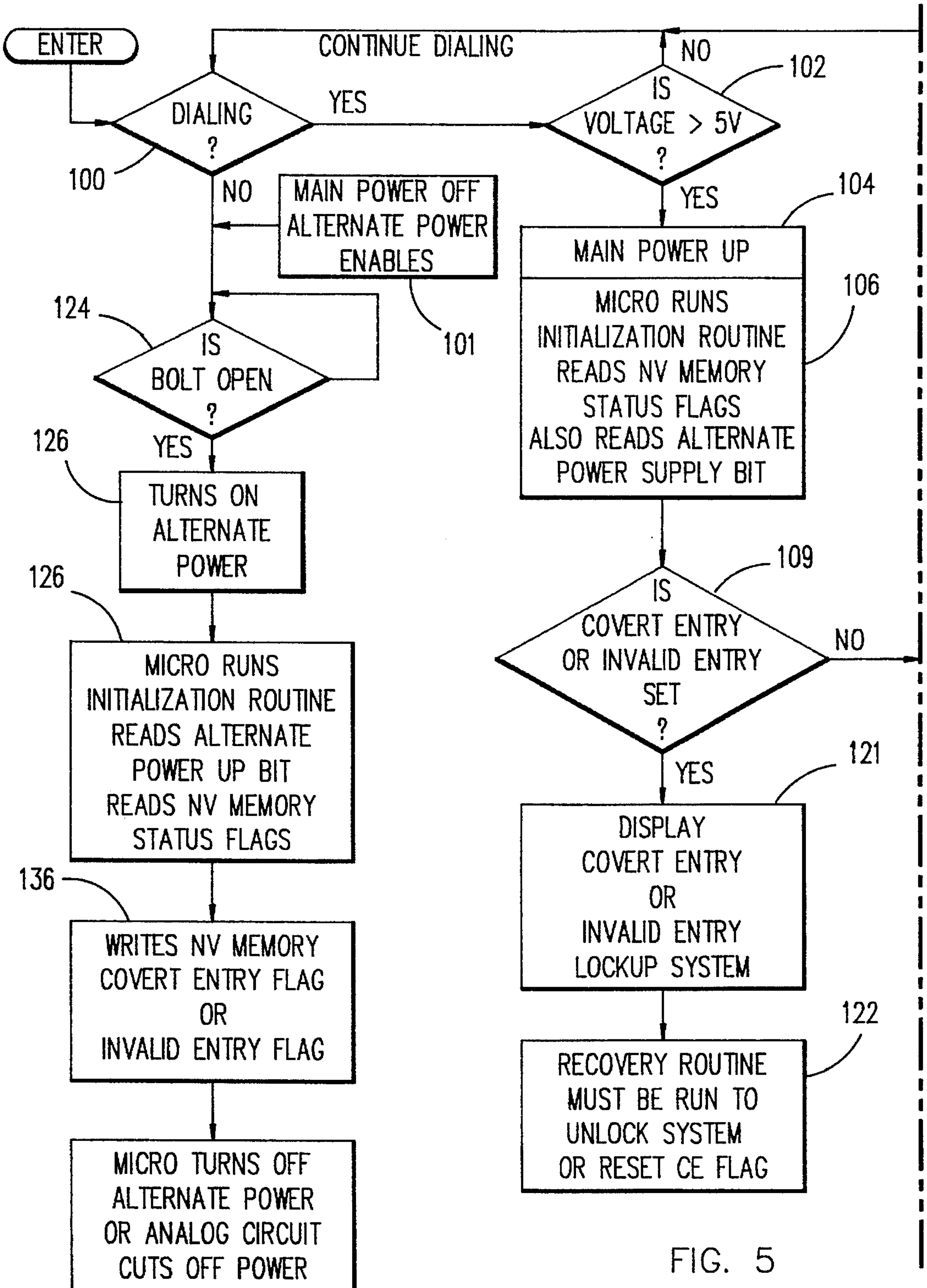
FIG. 5 illustrates the relationship of FIG. 5A to FIG. 5B.
Figure 5A:
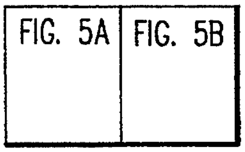
FIGS. 5A and 5B are portions of a flow diagram representing the logic for operating the lock of FIG. 1 with the inhibition of the alternate power source.
Figure 5B:
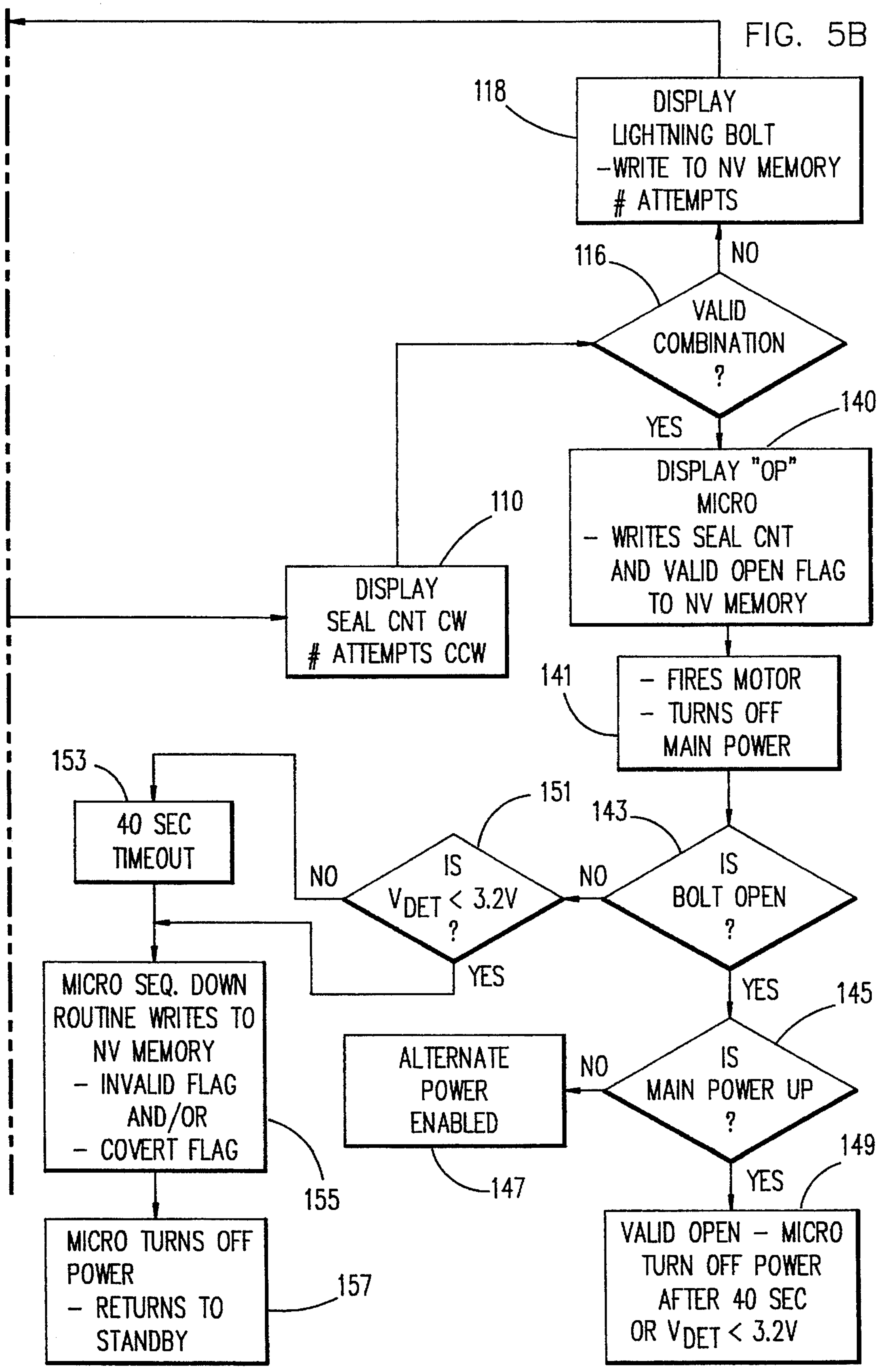

Refer now to FIG. 5. The logic diagram of FIG. 5 in many respects closely resembles the logic diagram of FIG. 4. With respect to FIG. 5, all the evenly numbered operations are same as those identically numbered operations in FIG. 4. With respect to operations carrying odd numbered reference numerals, more detailed explanation of those operations will be made with respect to FIG. 5. The sequences of evenly referenced numeral operations in FIG. 5 will be briefly commented on and described; however, should more detailed description be necessary, reference is made to the identical operation in FIG. 4 and the description of those operations with respect to FIG. 4, above.

Entry is determined by the presence of dialing or lack thereof in operation 100 identical to the logic operations in FIG. 4. Whenever knob 14 of the lock 10 is being dialed then a determination is made continuously as to whether the voltage on the power supply capacitor C100 in fact has reached 5 volts in operation 102. In the event that the voltage has not risen to 5 volts, then the flow returns to operation 100 and continues to loop until such time as the voltage attains 5 volts minimum. Upon attaining 5 volts, the microprocessor 44 is powered up at operation 104 and the microprocessor 44 runs the initialization routine contained within its ROM memory 45 and reads the non-volatile memory 43 and particularly selects the status flag locations therein. This operation is accomplished at operation 106.

Following the reading or retrieval of the status flags, the Covert Entry and Invalid Entry flags are tested at operation 109 to determine whether they are set. In the event that either of the flags is set as stored in the non-volatile memory 43 by the microprocessor 44, then the Covert Entry indication, "CE" or the invalid entry, "IE" will be displayed on display 18. Following the display of the Covert Entry or Invalid Entry indication on display 18 for the benefit of the operator, the lock may lock up and refuse to operate further.

The preferred method of implementation of operation 121 allows the lock 10 to be opened each time a valid combination is entered. The Covert Entry indication will be displayed on the LCD 18 each time the lock 10 is dialed and will remain displayed for several 360° turns of the dial 14 prior to allowing the combination to be dialed. This will sufficiently alert the operator to the fact that a covert entry has occurred and will continue to indicate covert entry at the beginning of all dialing sequences until a recovery routine is run that resets the display routine and Covert Entry flag. The recovery routine may be implemented by using a special select mode number and sequence of numbers to be entered to reset the display indication and Covert Entry flag in the non-volatile memory 43 by the microprocessor 44.

An alternative embodiment may cause the system to lock up or be disabled to prevent any further operation of the lock 10 by means of an authorized combination. While the preferred embodiment is to permit the lock 10 to continue to operate the lock-up mode is illustrated at this point as an alternate embodiment.

In order to return the lock 10 to its fully operational state, a recovery routine or a reset code must be entered into the microprocessor 44 by dialing knob 14 to reset the flags within the non-volatile memory 43 and to permit the lock 10 to recognize an authorized combination. This reset routine must be run in operation 122 following any lock up of the system in operation 121.

In the event that the Covert or Invalid Entry flags are not set, there has been no Covert Entry nor has there been any Invalid Entry attempt which must be conveyed to the operator; therefore, the operation of the lock 10 may proceed as normal. Operation 110 represents the display of the seal count when the knob 14 is turned in a clockwise direction and a display of the number of attempts count when knob 14 is rotated in the counterclockwise direction to inform the operator how many times the seal of the vault has been broken due to correct and proper opening as well as the number of incorrect or invalid attempts to operate the lock 10 since the last time it has been opened using a valid combination.

Thereafter, any dial entered combination is tested at operation 116; and in the event the combination is not an authorized combination, the lightning bolt is displayed indicating to the operator that an erroneous combination has been entered and the number of attempts count is incremented and written to non-volatile memory 43, in operation 118. Thereafter the flow returns to block 100 wherein the routine must start again with the operator attempting to enter an authorized combination.

Should the dial entered combination be found valid in operation 116, the "OP" symbol for open is displayed on display 18 and the seal count incremented by one and written to the non-volatile memory 43 by the microprocessor 44. Further a Valid Open flag is written to the non-volatile memory 43 indicating that the opening of lock 10 is a result of the entry of a valid combination in operation 140.

Thereafter, in operation 141, the motor 46 is fired or energized by motor fire circuit 40 to position mechanical elements within the lock housing 22 to permit the lock 10 to be opened by further rotation of knob 14 in the proper direction. In addition at operation 141, the main power supply voltage 200, Vcap, is inhibited with the main power supply remaining in its energized and active operational state.

Proceed now to operation 143. The monitoring circuit (to be described later with reference to FIGS. 6, 7 or 9) continues to monitor whether the bolt 26 is retracted or extended. If the bolt 26 is moved, the flow proceeds from operation 143 to 145 wherein the main power source C100 is checked to determine if it is the present source of electrical energy being supplied to the lock 10. Should the main power source C100 be determined as operational, in operation 145, the opening of the lock 10 is determined to be a valid opening and the microprocessor 44 then turns off the power forty seconds or other preselected time period after the main power is determined to be operational in operation 145. This turn-off after 40 seconds provides an adequate time period for any further operation of the lock and conserves the energy remaining in the capacitor of the main power supply 36 of the lock. In the event that the main power source C100 is not active at this time then the alternate power source C200 is enabled in operation 147. Alternatively, in operation 149, in the event that the voltage, Vcap, on the main capacitor C100 should bleed down to less than 3.2 volts, the main power source inhibit circuit (to be described later) will turn off the power source C100 to conserve the voltage, Vcap.

Referring back to operation 143, if the bolt 26 is determined to be not open by the bolt detection circuit of FIG. 6, the voltage, Vcap, on the microprocessor 44 is tested at operation 151 to determine whether Vcap is less than 3.2 volts. If that voltage is not less than 3.2 volts then a 40 second time out occurs at operation 153; and following the time out, the microprocessor 44 will begin its sequencing down routine which includes writing an Invalid Entry flag or a Covert Entry flag to the non-volatile memory 43. After preserving the status flags for Invalid Entry and Covert Entry at operation 155 if either a Covert Entry or Invalid Entry has occurred, the microprocessor 44 turns off its power as will be described with respect to the main power inhibit circuit of FIG. 7 (to be described later). At this point the alternate power source C200 is enabled and the system is effectively placed in standby condition with the alternate power source C200 providing the necessary voltage Vcap' to detect any covert entry.

Refer back to entry condition 100. In the event that dial 14 is not being turned, then block 101 represents the status of the monitoring circuitry of FIG. 6, with microprocessor 44 turned off because main power source C100 Vcap is turned off, the alternate power source C200 is enabled, and lock 10 and associated monitoring circuitry, FIG. 7, remain in a standby condition. The position of bolt 26 is continuously monitored by bolt detection circuit in FIG. 6; and in the event that the bolt 26 is not open, then the monitoring will continue as represented by the negative path which loops back to re-enter operation 124.

Whenever bolt 26 is detected as moved from the locked position, the alternate power source C200 voltage, Vcap' is turned on in operation 126. With connection of the alternate power source C200 voltage, Vcap', operation 128 is entered and the microprocessor 44 runs its resident initialization routine and reads the alternate power bit. If the alternate power bit is up, then the microprocessor 44 will read the non-volatile memory 43 and the status flags contained therein. The alternate power bit is a signal provided to the microprocessor 44 over line 202 in FIG. 6, to be discussed later.

Thereafter in operation 137 non-volatile memory 43 is written to record a Covert Entry or an Invalid Entry as represented by Covert flag or an Invalid flag. The choice of the Covert Entry flag or Invalid Entry flag depends on the absence or presence of a valid open flag read from non-volatile memory 43 in operation 128. At this point, the microprocessor 44 then turns off the alternate power source C200 voltage Vcap' or the analog circuit of FIG. 7 cuts off the alternate power source C200 Vcap' in operation 134. With the microprocessor 44 turning off the alternate power source C200 voltage, Vcap', the lock 10 will return to the inactive condition and continue to monitor lock 10 for Covert or Invalid entries.

The flow through operations 101, 124, 126, 128, 137 and 134 are the logical process steps that occur when the lock 10 has not been powered by dialing and yet the bolt 26 has been moved. To open the bolt 26 without the dialing and entering a valid combination will result in a conclusion that the lock 10 has been violated and covertly entered. Accordingly, the covert entry is indicated by the recording of the Covert Entry flag in the non-volatile memory 43. If the entry is considered an Invalid Entry, the Invalid flag is similarly set. Once the appropriate flag has been set in operation 137, the information is then available in the non-volatile memory 43 to microprocessor 44 to indicate to the operator that a Covert or Invalid Entry has occurred whenever the next normal entry process is initiated by the operator dialing the lock 10 and powering the microprocessor 44 to run its resident initialization routine.

Referring to FIG. 6, the bolt position detector circuit is illustrated with C100 providing voltage Vcap and C200 providing voltage Vcap' and with capacitors C100 and C200 bridged by diode D1. Capacitor C100 is the main power source for operation of the electronic combination lock 10 while capacitor C200 is the alternate Super Cap which powers the microprocessor 44 for recording a Covert Entry flag or Invalid Entry flag in the non-volatile memory 43 by the microprocessor 44 in FIG. 2.

Diode D1 permits the simultaneous charging of capacitors C100 and C200 with the electrical power from generator 29 of FIG. 2. Diode D1 further isolates capacitor C200 so that the normal draw of power on capacitor C100 by the lock power supply will not bleed the power from capacitor C200.

Figure 10C:
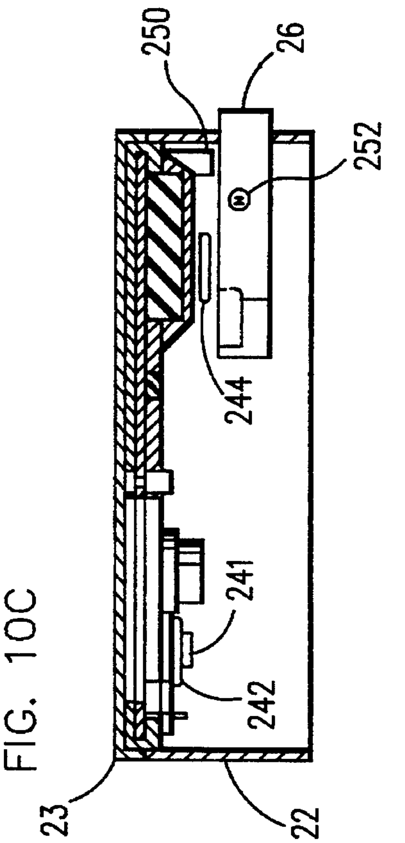
FIGS. 10A, 10B, 10C and 10D illustrate the installation of a reed switch within the lock housing.
Figure 10D:
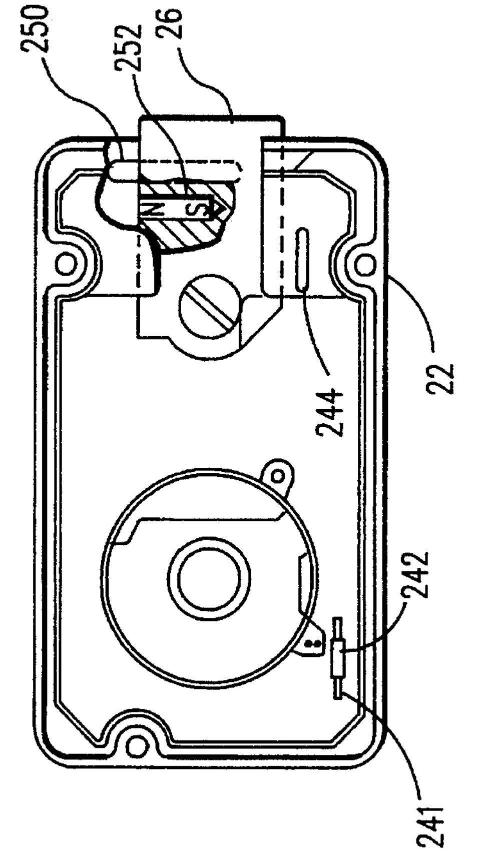
Figure 10A:
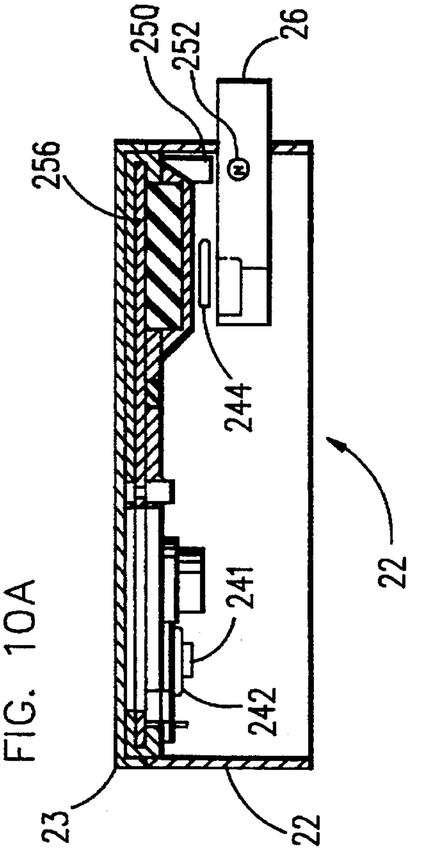

Switch S1 is preferably a reed switch responsive to a magnet 252 as in FIG. 10A, mounted in or on the bolt 26 of lock 10. When the bolt 26 is extended or locked, switch S1 connects to ground thereby grounding capacitor C1 and the gate of transistor Q2 which is a NFET transistor. With capacitor C1 discharged, the gate of transistor Q2 is likewise bled to ground. With capacitor C1 discharged, no charge exists on the gate of NFET Q1, thus turning off the NFET Q1. With the NFET Q1 turned off or non-conductive, the PFET Q3 likewise will be turned off due to the rise in voltage on the gate thereof through resistor R1.

Accordingly, in a normal lock 10 closed state, switch S1 prevents any electrical energy from passing from capacitor C200 or from capacitor C100 through transistor Q3 and therefore eliminates the source of Vcc from being Vcap'. With transistor Q2 non-conductive, the voltage impressed across resistor R3 will cause the microprocessor 44 input line 202 to go high indicating a not alternate power condition, when Vcc exists. Accordingly, the microprocessor 44 when powered by the voltage on capacitor C100 through the lock power supply 200 will recognize that the signal on line 202 indicates the power is not coming from the alternate power source (capacitor C200) but rather from the primary power source or capacitor C100. This signal is referred to as the alternate power bit.

The lock power supply 200 controls the voltage Vcap from capacitor C100 and passes it to line 204 where it provides the operating voltage Vcc to the liquid crystal display driver 19, microprocessor 44 and the non-volatile memory 43 and logic as shown in FIG. 2 which make up the electronics 24 of lock 10.

When switch S1 transfers as a result of movement of bolt 26, the voltage Vcap' from capacitor C200 biases the gate of transistor Q1 and turns on transistor Q1 grounding the gate of PFET Q3, turning on PFET Q3.

Capacitor C1 and resistor R2 define an RC time constant prior to the voltage on gate of Q1 decreasing to a voltage threshold to render Q1 non-conducting. Thus there is a time period controlled by the RC time constant, allowing the microprocessor 44 to run its initialization routine before transistor Q1 turns off transistor Q3.

Accordingly, the resistance value of R2 and the capacitance of C1 are chosen to provide a minimum of 50 milliseconds and a maximum of 450 milliseconds during which the voltage charge Vcap' is connected to the microprocessor 44 providing the microprocessor 44 with adequate time and power to initialize and store a Covert/Invalid Entry flag.

As can be seen from the foregoing description, the circuit of FIG. 6 acts as a bolt 26 position monitor and power control to power the microprocessor 44 upon the detection of a bolt 26 movement.

Figure 7:
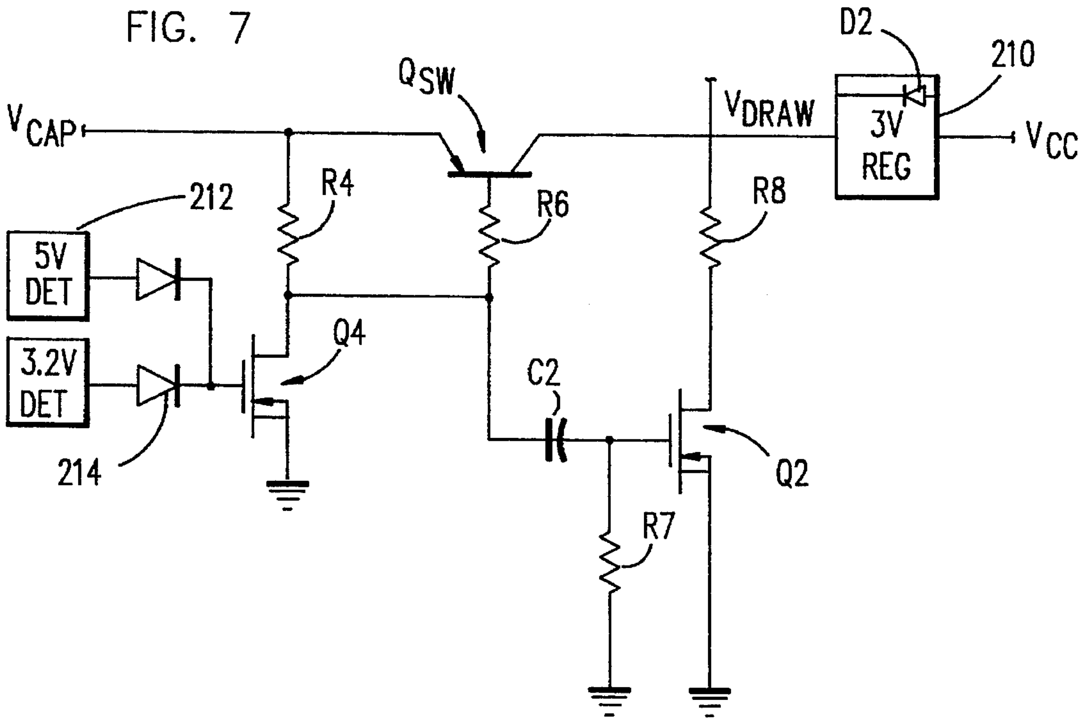
FIG. 7 illustrates a circuit for turning off the main power supply either by the microprocessor or AC coupled NFET transistors.

In FIG. 7, The 5 volt detector 212 is the first element to go active when the generator 29 in FIG. 2 is operated and Vcap reaches 5 volts. Upon Vcap reaching 5 volts, the detector 212 will output a high signal which will pulse and turn on NFET Q4 through C12, which in turn, turns on Qsw (a Darlington transistor).

When transistor Qsw turns on, the 3Y regulator 210 supplies Vcc to the microprocessor 44 and the microprocessor 44 becomes active providing voltage to Q4 through diode 214. This latches the power on. With the microprocessor now being the controlling device, it is able to turn off transistor Qsw and shut down the power to the lock 10 under the control of the microprocessor 44. As illustrated with C2 and R7 and the combination of transistors Q4 and Q2 connected, the circuit can very rapidly discharge voltage Vcc and thereby insure that the logic is very quickly readied for repowering and an initialization routine.

The network of capacitor C2, resistor R7 and NFET Q2 create an RC time controlled switch which will allow sufficient time for the voltage bleed down to occur before Q2 will become non-conductive.

The bleed down of Vcc is accomplished through a diode D2 which connects Vcc to Vraw and only conducts when Vraw is lower than Vcc. The rapid bleed off of Vcc insures that there is neither a time period during which a conflict in conditions can exist nor the microprocessor can be confused if alternate power source voltage Vcap' is applied to the microprocessor 44 while some residual Vcap voltage remained on the processor.

Figure 8:
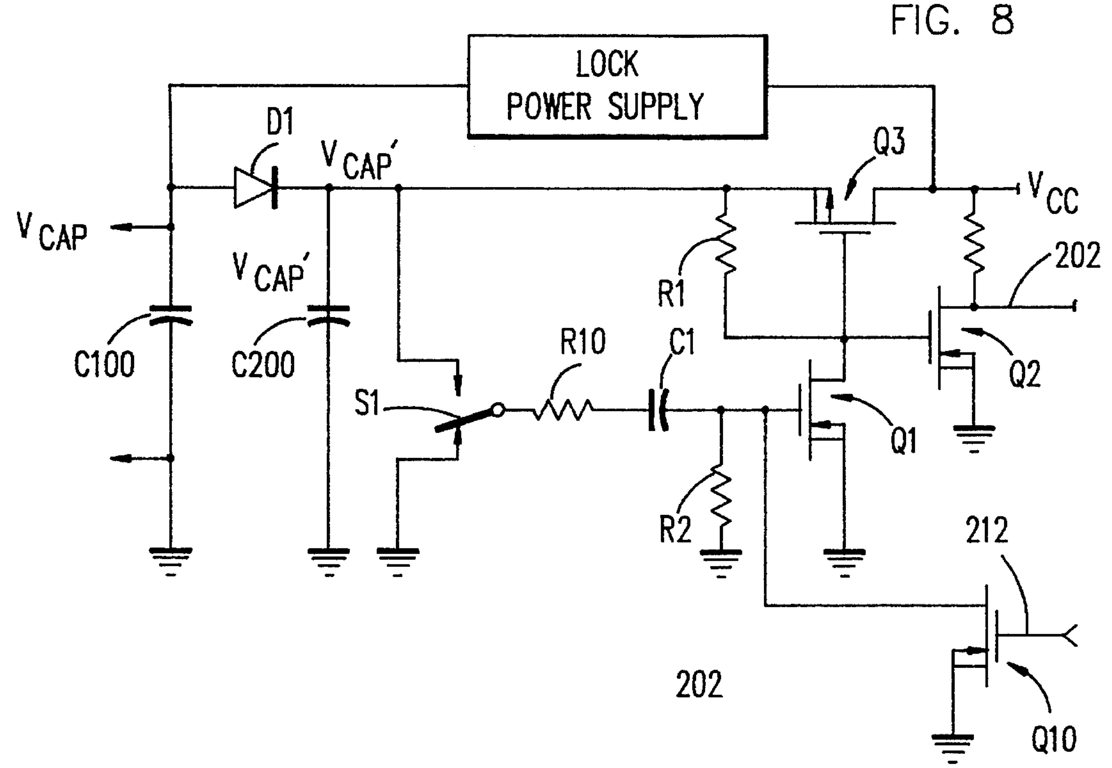
FIG. 8 illustrates a PFET transistor inhibit circuit for inhibiting discharge of the capacitors providing Vcap and Vcap', the main and alternate power sources for the microprocessor shown in FIG. 2.

FIG. 8 illustrates a circuit where the microprocessor 44 inhibits the PFET transistor Q3 to turn off the alternate power source C200 voltage, Vcap' when the main power source C100 is charged and a valid combination has been entered.

FIG. 8 is substantially identical to the circuit illustrated in FIG. 6 with the following exceptions: Interposed between switch S1 and capacitor C1 is a resistor R10; and connected at the node that joins the gate of transistor Q1 and resistor R2, there is connected a line leading to NFET Q10. Q10 is connected to ground and the gate of NFET Q10 is controlled by microprocessor 44 output such that when the voltage Vcc is high during normal lock operation, the microprocessor will inhibit Q3 by providing a high signal to the gate of Q10 over line 212.

As can be seen from the circuit in FIG. 8 the microprocessor 44 output signal on line 212 will turn on Q10; and when Q10 conducts, Q1 will be rendered non-conductive, in turn turning off transistor Q3, thereby turning off Vcap' and isolating capacitor C200 from the Vcc connection. Accordingly, the voltage Vcap' is turned off or inhibited by the microprocessor 44 when the main power capacitor C100 is charged and a valid combination has been entered. This conserves the energy stored in C200 Vcap' so that it will be available when the lock 10 returns to its standby mode and Vcap is bled down normally.

Figure 9:
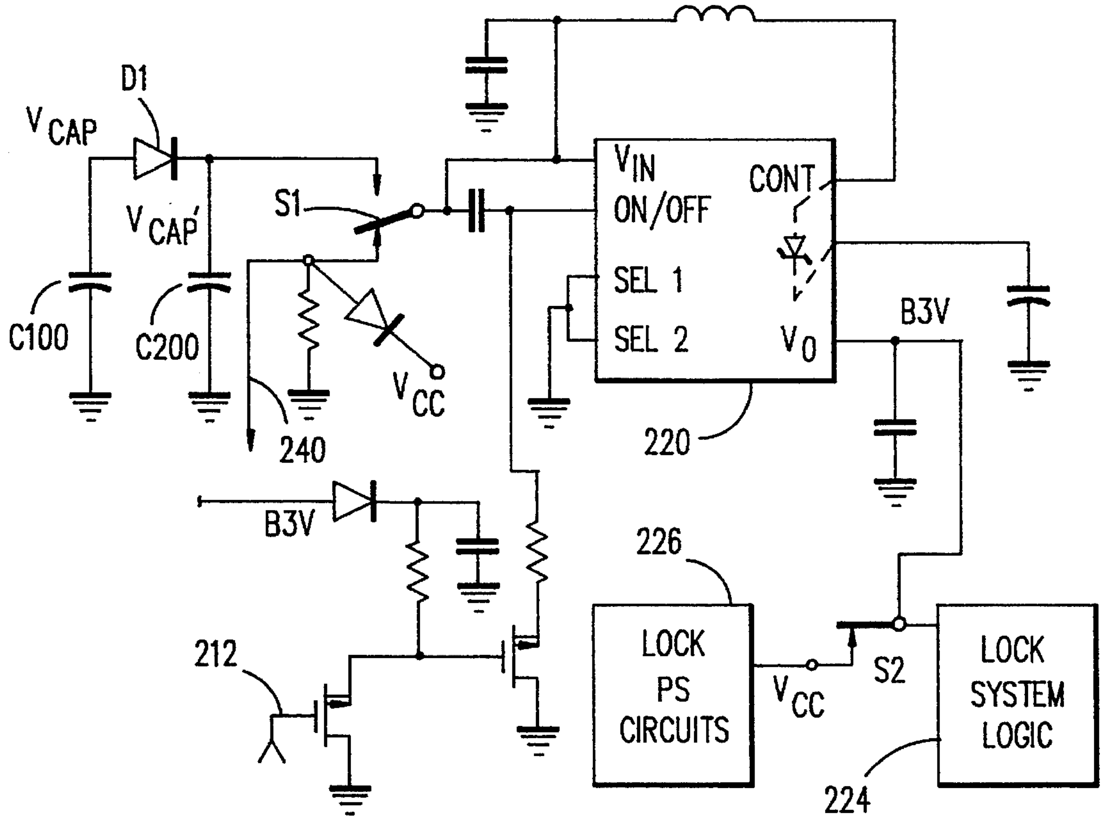
FIG. 9 illustrates a circuit for microprocessor control and powering from Vcap' when the Vcap' decays below that required to operate the lock microprocessor.

FIG. 9 illustrates a further embodiment wherein two reed switches S1, S2 may be used to operate the electronics based upon the movement of the bolt 26. Switch S1 is maintained grounded when the bolt is extended as in FIGS. 6 and 7. Incorporated into the circuit is a voltage regulator module 220 which may be, for example, an S-8430AF sold by Seiko Instruments, Inc. of Tokyo, Japan. The voltage regulator module 220 is used instead of the PFET Q3 found in FIGS. 6 and 8. The advantage to using the voltage regulator module 220 occurs in those instances when a substantial period of time has elapsed since the last time the lock system 10 has been powered. The voltage, Vcap' may have decayed to between 1.5 and 1.8 volts. Voltages of less than 1.8 volts are typically insufficient to power-up and operate the microprocessor 44 of FIG. 2. Accordingly, any covert entry would not be detected since the microprocessor 44 would not power-up and would not run its initialization routine and would not record the Covert Entry flag in the non-volatile memory 43. The voltage regulator module 220 is capable of stepping up a voltage of 1.5 volts to a voltage of about 3 volts, sufficient to operate the microprocessor 44 and logic circuitry at a reliable level for a time sufficient to record the Covert Entry indication in the form of a Covert Entry flag. When using the voltage regulator module 220 in lieu of the PFET Q3 in FIGS. 6 and 8, it is necessary to incorporate a second reed switch S2 which then will be opened at the same time that switch S1 closes to connect Vcap' to the voltage regulator module 220. This insures that the small remaining voltage, Vcap' will be used in its stepped-up form only to power the system logic 224, and that none of the voltage Vcap' will be used or lost in any back currents through the lock power supply circuits 226. Accordingly, switch S2 acts as an isolation switch and transfers responsive to the bolt 26 movement.

The beneficial result flowing from the use of the voltage regulator module 220 is the longer period of time available for the detection of a covert entry because the lower minimum voltage requirement for the system may be exceeded for a longer period of time before the Vcap' voltage bleeds down and leaks as a result of internal leakages in the capacitor C200. If necessary, the effective period for detection of Covert entry may be extended from several weeks to many months with the use of module 220.

Figure 10B:
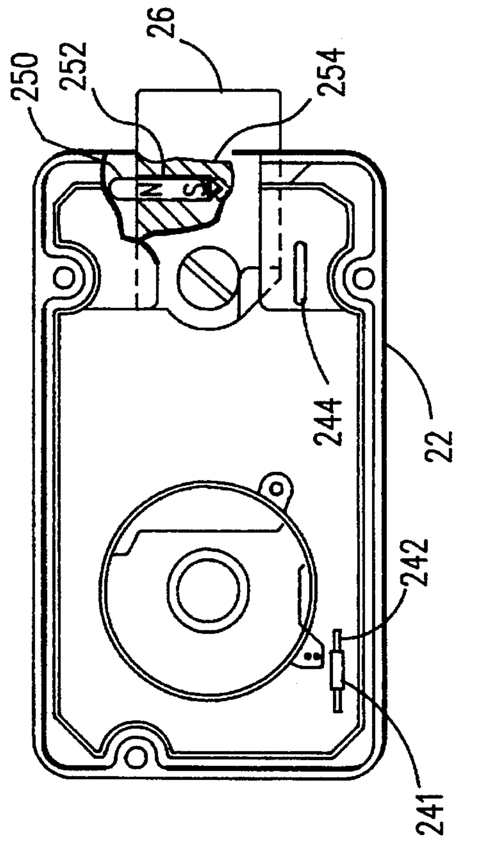

With reference to FIGS. 10A, 10B, 10C and 10D, lock housing 22 is illustrated in both top and front views. The lock housing 22 is provided with bolt 26 which is displaceable from an extended position to a withdrawn position. Bolt 26 is shown with a magnet 252 positioned within bolt 26. Magnet 252 may be inserted into a blind hole 254 drilled into bolt 26, which is best illustrated in FIG. 10B. Magnet 252 may be placed into the blind hole 254 and cemented in place. Reed switch 250 (switch S1 in the circuit diagrams) may be disposed on the electronic assembly 256 contained within lock housing 22. With the bolt 26 in its locked position, magnet 252 is aligned to the reed switch 250 and thus reed switch 250 is activated. In FIGS. 10C and 10D, bolt 26 is shown in its retracted or withdrawn position, which corresponds to an unlocked condition. As can be seen in FIG. 10C, magnet 252 now is displaced from close proximity to the reed switch 250 and thus will cause reed switch 250 to transfer to its other state, in this case, a conductive state permitting the transmission of voltage, Vcap' to the electronic circuits. Additionally, any movement of the bolt will cause the reed switch to transfer.

Alternatively, the polarity of the reed switch 250 may be reversed and the magnet positioned away from the switch and transfers when the magnet is moved within its effective range.

Figure 11C:
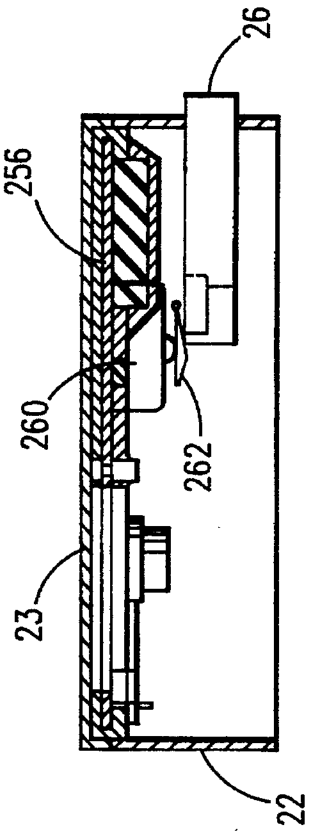
FIGS. 11A, 11B, 11C and 11D illustrate the installation of a lever actuated microswitch within the lock housing.
Figure 11D:
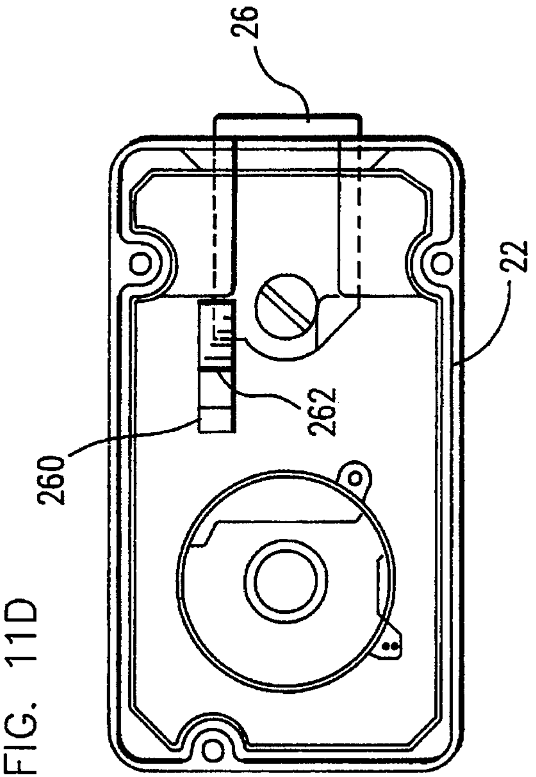
Figure 11A:
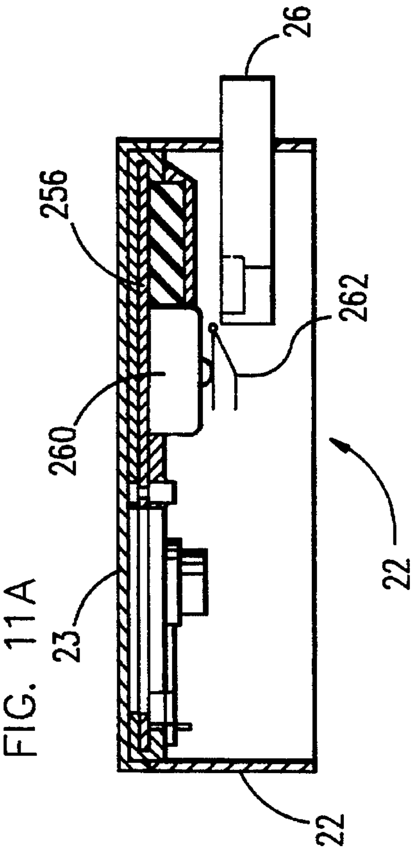
Figure 11B:
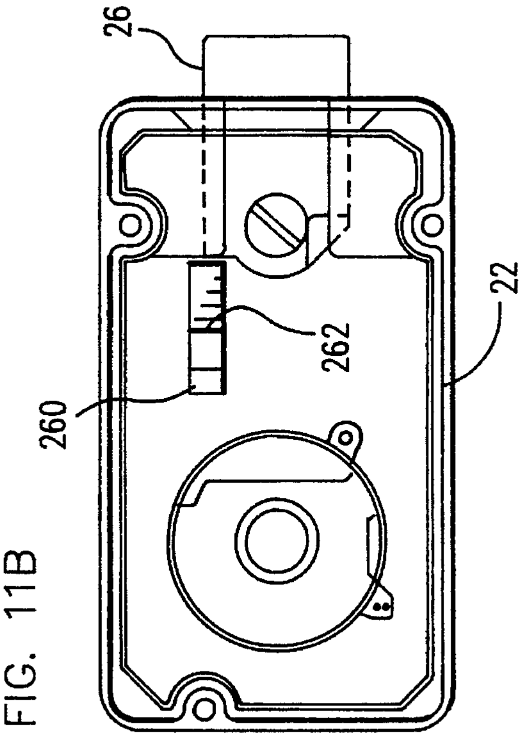

An alternative embodiment using a mechanical microswitch 260 which has a lever 262 is illustrated in FIGS. 11A, 11B, 11C and 11D. The microswitch 260 is similarly mounted on the electronics board 256 in a position such that the lever 262 occupies a position in the path of bolt 26. Bolt 26 in its extended position will not engage lever 262 and will not activate switch 260. However, as can be seen in FIGS. 11C and 11D, with the bolt 26 withdrawn to its open position, lever 262 is engaged by bolt 26 and depressed toward switch 260 causing the activation of switch 260.

Other embodiments could utilize a Hall-Effect device mounted in place of the reed switch 250 in FIGS. 10A through 10D. If a suitable light source is available, a photodetector arrangement could be positioned such that bolt 26 would intercept the light beam when the bolt 26 was displaced from its extended to its retracted position.

The circuits illustrated in FIGS. 6 and 8 serve to provide an alternate power bit or signal on line 202 to microprocessor 44 indicating when the alternate power source C200 is being used or when it is not. These circuits likewise provide an input to the microprocessor 44 responsive to bolt 26 movement by virtue of the fact that when switch S1 is transferred from its condition as indicated in FIGS. 6 and 8 as connected to ground, to being connected to Vcap', transistors Q1 and Q3 are operated to control the connection of the voltage Vcap' to the microprocessor 44 so that the microprocessor 44 may be powered up and run its initialization routine and record the Covert Entry flag into non-volatile memory 43 as represented by operations 128 and 137 in FIGS. 4 and 5.

Circuits illustrated in FIG. 7 provide the capability of the microprocessor 44 to cut off the main power source C100 voltage, Vcap, and very rapidly to bleed the power off the electronics including microprocessor 44. This insures that the logic in the microprocessor 44 and associated circuits is ready to receive a voltage surge in the event that the bolt 26 is moved from its extended to its retracted position without the microprocessor 44 being powered by the main power supply C100.

The implementation of the logical flow as presented in FIGS. 4 and 5 may be made by programming a microprocessor 44 in accord with the specific requirements of that microprocessor 44, as set forth by its manufacturer, in combination with some of the circuits disclosed herein. The programming necessary may be accomplished by one of ordinary skill in the art of programming microprocessors following the requirements as set forth in FIGS. 3 and 4 as well as the associated description of operations, circuits, functions and requirements.

A preferred microprocessor 44, being one which has a low power requirement, is a Phillips P83CL781 available from Phillips Semiconductor of Sunnyvale, California 94088, but other microprocessors may be used if desired. The preferred memory for the microprocessor 44 is an EEPROM manufactured by and distributed under the designation of AT93C46-10SC-1.8 by the Atmel Corporation of San Jose, California 95131. Other low voltage EEPROMS may be used if desired.

The above-described circuits and lock 10 incorporating a microprocessor 44 and program controls together with the self-powering internally contained generator system permits an electronic lock 10 to detect and record covert entries, whenever the bolt of the lock 10 is moved without the lock 10 having been provided an authorized combination. The detection of the covert entry may occur during a period when the lock 10 is not adequately powered to operate in its normal state, by virtue of a voltage charge Vcap' stored in a capacitor C100 known as a Super Cap, and is controlled so that the voltage charge Vcap' in the Super Cap C100 is used only for the purpose of causing the microprocessor 44 in the lock 10 to run its initialization routine and record a bit representing the fact that a covert entry has occurred.

Thereafter, when the lock 10 is operated in a normal fashion and is provided with sufficient power through the rotation of the knob 14, the microprocessor 44 will read its memory and detect the presence of the Covert Entry flag and display "CE" an indication that the covert entry has occurred.

Resetting or reconditioning the lock 10 to accept authorized combinations may be accomplished by powering the lock 10 through rotation of knob 14 until such time as the lock 10 is adequately powered to operate and subsequent entering of predetermined values in a predetermined manner and sequence. These values may be the authorized combination of the lock 10 plus some additional requirement such as a second combination which would only be used during a special select mode for purposes of resetting the Covert Entry flags. The precise resetting requirements are not essential to the invention detecting Covert Entry as disclosed and claimed herein; and, therefore, detailed description thereof is not included in this description.

Referring to FIG. 3, switch S11, shown as 244 in FIGS. 10A–10D, is connected in parallel with switch S10. Switch S11 is preferably a reed switch which is normally open and does not require a magnet to maintain it as an open state. A magnetic field will close the switch S11. It is conceivable that a strong magnet may be used to attack the lock 10 as described in co-pending U.S. patent application Ser. No. 07/851,511, filed Mar. 16, 1992, by Thomas E. Cassada, et al., for Electronic Combination Lock With Magnetic Anti-Attack Interlock, or to hold the bolt movement detect switch S1 against transfer upon bolt 26 movement. With the magnet detect switch S11 activated by the attack magnet, the covert entry or attack will be detected and the operator notified.

Several embodiments of the invention have been described and may be selected for implementation by one wishing to practice the invention. One of ordinary skill in the art will recognize that additional changes and modifications or combinations may be created to accomplish the primary function of this invention without departing from the scope of the claims attached hereto.

We claim:

1. An electronic lock having a covert entry detection and reporting means, comprising:

an electronic logic control controlling operation of said lock;

said logic control further comprising program control for controlling operations of said logic control;

non-volatile memory connected to said logic control to receive and store data from said logic control and to provide stored data to said logic control;

a bolt having an extended, locked position and a retracted, unlocked position;

manually operated data entry device capable of entering combination data into said lock and said logic control;

a manually operated electrical power generator to generate electrical power and electrical signals indicative of operation of said generator;

a first electrical storage for storing electrical energy generated by said generator for use by said logic control, said first storage providing an electrical voltage;

a second electrical storage connected intermediate said generator and said electronic logic control;

a bolt movement detector;

a control responsive to said detector to connect said second electrical energy storage to said logic control, thereby conducting stored electrical energy from said second electrical energy storage to said logic control;

said logic control responsive to electrical energy provided to said logic control and an absence of said electrical signals from said generator to store in said memory a predefined indication of the operation of said bolt movement detector.

2. The lock of claim 1 wherein said logic control and said program control further determines a presence of any said stored predefined indication in said memory and further comprises:

an alerting device to alert an operator of said lock, responsive to said, determination that a covert entry has occurred.

3. The lock of claim 2 wherein said logic control comprises a program controlled microprocessor.

4. The lock of claim 3 wherein said microprocessor and said program control further comprises:

means, responsive to said determination of a presence of said stored indication in said memory to condition said microprocessor to refuse to accept a valid combination.

5. The lock of claim 3 wherein said alerting device comprises a display, observable by the operator.

6. The lock of claim 5 wherein said microprocessor and said program control means further comprises:

means for determining a presence of any said stored predefined indication in said memory;

means, responsive to said determining means for conditioning said microprocessor to refuse to accept a valid combination.

7. The lock of claim 1 further comprising a voltage detector for detecting said voltage from said first electrical energy storage below a predetermined voltage level and responsive to said detection disconnecting electrical energy from said first electrical energy storage to said electronic logic control.

8. The lock of claim 1 further comprising:

means responsive to said electronic logic control for disconnecting said second electrical energy storage from said electronic logic control when said first electrical energy storage is providing electrical energy to said electronic logic control greater than that required to operate said electronic logic control.

9. The electronic lock of claim 1 further comprising:

a lock housing;

a lock housing cover attached to said lock housing and in cooperation with said lock housing forming an enclosed container for containing at least said logic control means, said memory, said generator, said electrical energy storage means, said detection means and said control means;

means for detecting removal of said lock housing cover, and said control means further responsive to said means for detecting said removal.

10. The electronic lock of claim 1 wherein said logic control means comprises:

means, responsive to said entry means, for accepting and validating entered authorized combinations, and;

said logic control means further comprises means for storing in said memory an indication of entry of an authorized combination;

said logic control means further comprising means responsive to electrical energy from said second electrical energy storage means, an absence of electrical energy from said first electrical energy storage means and presence of said indication of entry of an authorized combination, for storing in said memory and indication of an invalid entry.

11. The electronic lock of claim 2 wherein said logic control means comprises:

means, responsive to said entry means, for accepting and validating entered authorized combinations, and;

said logic control means further comprises means for storing in said memory an indication of entry of an authorized combination;

said logic control means further comprising means responsive to electrical energy from said second electrical energy storage means, an absence of electrical energy from said first electrical energy storage means and presence of said indication of entry of an authorized combination, for storing in said memory and indication of an invalid entry.

12. An electronic combination lock comprising a covert entry detection and alerting function, said lock comprising:

a housing and a housing cover;

a bolt, movable from a locked to an unlocked position;

an electronic control for controlling acceptance of combinations, validation of combinations and movement of said bolt for opening;

a dial for entering said combination and providing force to move said bolt;

a bolt movement detector;

said electronic control further responsive to said bolt movement detector to store an indication of covert entry;

said electronic control responsive to said bolt movement detector to determine when said bolt movement is responsive to a validated combination entered into said electronic control;

said electronic control further responsive to said entry of said authorized combination for inhibiting said electronic control from storing said indication of said covert entry.

13. The electronic combination lock of claim 12 further comprising:

means for sensing a magnetic field imposed on said lock and means for detecting separation of said housing and said housing cover;

said electronic control further responsive to said means for sensing or said means for detecting separation;

said means for storing an indication further responsive to said means for sensing and said means for detecting separation, whereby removal of said housing cover or application of a magnetic field to said lock for any purpose, will be detected and a covert entry indication stored in said electronic control.

14. An electronic combination lock comprising:

electronic controls for controlling operations of said lock, including means for validating authorized combinations provided to said electronic controls;

a bolt movable from a locked position to an unlocked position;

a bolt movement detector;

said electronic controls comprising determining means responsive to said bolt movement detector for determining if movement of said bolt results from entry of an authorized combination;

means, responsive to said determining means for alerting an operator of a prior movement of said bolt without an authorized combination having been entered.

15. The lock of claim 14 further comprising:

means for enabling movement of said bolt, responsive to said electronic controls and entry of a valid combination into said electronic controls;

means for detecting existence of a predetermined condition;

means for timing a predetermined time period;

means for determining lack of bolt movement prior to detection of said predetermined condition or prior to expiration of said predetermined time period;

means, responsive to said bolt movement detector and said means for determining lack of bolt movement for alerting an operator that movement of said bolt has occurred as a result of an authorized combination and after said predetermined condition was detected or after said time period expired.

16. The lock of claim 15 wherein said electronic controls comprises:

at least one source of stored electrical energy; and said predetermined condition comprises a voltage from said source of stored electrical energy being less than a predetermined level.

17. An electronic combination lock comprising:

electronic controls, including electronic memory, for controlling said lock:

a container for containing said controls:

said container comprising a housing and a cover attached to said housing;

means for detecting removal of said cover;

said electronics comprising means, responsive to said means for detecting removal, for storing in said memory an indication of covert entry;

said electronics further comprising alerting means responsive to said indications for alerting an operator of said lock that said lock has been violated.

18. The lock of claim 17 further comprising:

means for detecting the presence of a magnetic field disposed within said housing and outside the magnet field influence of any magnets contained within said housing, is connected in parallel with said means for detecting removal of said cover, whereby any attack on said lock involving a magnet disposed proximate to said lock housing will be detected and said means for storing in said memory an indication of covert entry will be activated.

19. The lock of claim 18 wherein said means for detecting removal of said cover comprises a first reed switch having two states, one conductive and one non-conductive, and a cover magnet disposed so that said magnet holds said reed switch in one of said states when said cover is disposed on said housing.

20. The lock of claim 19 wherein said means for detecting the presence of a magnetic field comprises a second reed switch having a conductive state, when not influenced by a magnetic field, the same as the conductive state of said first reed switch of said means for detecting removal of said cover, when said cover magnet holds said first reed switch in said one state.

21. The lock of claim 18 wherein said first reed switch is removable with said cover and said magnet is disposed on said housing.

22. The lock of claim 17 wherein said means for detecting removal of said cover comprises a mechanical switch having a normally closed condition, said switch disposed within said container and held upon by said cover, when said cover is present and closes when said cover is removed.

23. A method of detecting covert entry of a lock comprising the steps of:

providing a lock comprising a bolt, a means for entering a combination into said lock, electronic means for validating said combination and memory for storing indications of conditions effecting operation of said lock;

detecting movement of said bolt;

determining any acceptance of a valid combination by said means for validating; and storing an indication of any said bolt movement when said step of determining results in a determination that no valid combination has been accepted by said means for validating.

24. The method of claim 23 further comprising the steps of:

reading any said stored indication of said bolt movement from said memory; and alerting an operator of said lock, upon reading any said stored indication of said bolt movement.

25. The method of claim 24 wherein said steps of reading and alerting occur during an operation of said lock subsequent to said step of storing.

26. The method of claim 24 wherein said step of alerting an operator comprises the step of:

displaying a visible signal of covert entry to said operator.

27. The method of claim 26 wherein said steps of reading and alerting occur during an operation of said lock subsequent to said step of storing.

28. The method of claim 26 further comprising the step of:

disabling said lock from validating a subsequently entered valid combination, whereby said lock is rendered to a condition that said lock will not open if said indication is stored in said memory.

* * * * *